United States Patent [19]

Cherry

[11] Patent Number: 5,297,518
[45] Date of Patent: Mar. 29, 1994

[54] MASS CONTROLLED COMPRESSION TIMED IGNITION METHOD AND IGNITER

[76] Inventor: Mark A. Cherry, 965-A Jamacha Rd., El Cajon, Calif. 92019

[21] Appl. No.: 926,740

[22] Filed: Aug. 10, 1992

[51] Int. Cl.⁵ .................................................. F02B 19/00
[52] U.S. Cl. ...................................... 123/260; 123/272; 123/266
[58] Field of Search ............... 123/260, 267, 272, 261, 123/48 R, 271

[56] References Cited

U.S. PATENT DOCUMENTS

| | | | |
|---|---|---|---|
| 1,700,603 | 11/1927 | Vreeland et al. | 123/267 |
| 2,456,080 | 12/1948 | Pe | 123/266 |
| 2,520,378 | 8/1950 | Veit | 123/261 |
| 3,710,764 | 1/1973 | Jozlin | 123/266 |
| 3,741,175 | 6/1973 | Rouger | 123/48 A |
| 3,892,991 | 7/1975 | Joslyn | 313/138 |
| 3,954,093 | 5/1976 | Hughes | 123/266 |
| 4,071,001 | 1/1978 | Goto | 123/267 |
| 4,218,993 | 8/1980 | Blackburn | 123/267 |
| 4,241,703 | 12/1980 | Lin-Liaw | 123/48 R |
| 4,319,552 | 3/1982 | Sauer | 123/267 |
| 4,338,897 | 7/1982 | Drumheiler | 103/267 |
| 4,465,031 | 8/1984 | Bamer | 123/260 |
| 4,499,399 | 2/1985 | Flores | 123/266 |
| 4,736,718 | 4/1988 | Linder | 123/267 |
| 4,834,042 | 5/1989 | Wakasa | 123/271 |
| 4,898,126 | 2/1990 | Merritt | 123/272 X |
| 4,977,873 | 12/1990 | Cherry | 123/266 X |
| 5,109,817 | 5/1992 | Cherry | 123/272 |

*Primary Examiner*—Raymond A. Nelli
*Attorney, Agent, or Firm*—William H. Maxwell

[57] ABSTRACT

A method and apparatus for compression timed ignition in internal combustion engines, the varying mass of the fuel-air mixture having controlling effect to retard timing by cooling a heater element to vary the current therethrough, and characterized by an igniter with a pre-chamber in communication with the engine combustion chamber via at least one and preferably a multiplicity of radiating ports for projecting burning plasma into the engine combustion chamber.

22 Claims, 2 Drawing Sheets

MASS CONTROLLED COMPRESSION TIMED IGNITION METHOD AND IGNITER

BACKGROUND OF THE INVENTION

This invention relates to Timing Chamber Ignition as it is disclosed and claimed in my U.S. Pat. No. 4,977,873 issued Dec. 18, 1990 and U.S. Pat. No. 5,109,817 issued May, 5, 1992, it being an object of this invention to control ignition timing by means of mass changes in the combustible mixture, in order to gain a positive slope proportional to engine load. This invention recognizes ignition delay in the Timing Chamber concepts taught by the aforesaid patents that increases when density decreases, producing a timing curve proportional to load but with a negative slope. The present invention has a timing delay but advantageously with a positive slope.

It is an object of this invention to provide an igniter with improved catalytic torch characteristics. With the catalytic plasma torch as it is herein disclosed (CPT) engine ignition is timed properly and lean stability is extended. The concept herein disclosed is based upon compression ignition of the charge in the igniter's pre-chamber, induced by timed catalytic reduction of the pre-chamber's activation energy. This produces substantially instantaneous combustion in the pre-chamber and is divided into multiple high velocity torches that efficiently ignite the cylinder chamber charge. The timing of the ignition event is based upon the location of the heated catalyst in the pre-chamber and the mass of the charge inducted into the cylinder.

It is an object of this invention to modify the basic timing curve by means of control which directly affects the catalyst activity. Dynamic modification to the timing event is accomplished by using the catalyst as an in-cylinder hot-wire anemometer. It is another object therefore to employ the activity of the catalyst to control ignition timing inversely proportional to the mass of the combustible charge. It is a primary object of this invention to utilize said hot-wire as an anemometer sensitive to changes in mass of the combustible fuel-air mixture, causing corresponding changes in the hot-wire mass so as to simultaneously function firstly as a catalyst to accelerate and improve combustion, secondly as a timing means to retard ignition when cooler and to advance ignition when hotter, and thirdly to produce a signal responsive to resistance changes in said hot-wire mass to govern control means for fuel injection and the like. This method and igniter replaces conventional spark ignition, including distributor, breaker points, coil and high tension leads, and spark plugs. Advantageously, this inventive concept has no moving parts, no sophisticated controls, and is essentially waterproof as well.

It is an object of this invention to provide an engine ignition system that inherently increases power, by vastly improving ignition. With the present invention the timing event occurs instaneously within the pre-chambers from which confinement the explosive plasma escapes through at least one and preferably through a multiplicity of directive ports. These ports are essentially nozzles that project fingers of plasma flame to cover the entire combustion chamber cross section. In practice, these fingers project tangentially from a circle described about the center axis of the igniter, in a spider-like manner.

It is another object of this invention to provide the same effect as a spark ignited fuel rich pre-chamber, but without the added complexity of a pre-chamber fuel supply. Accordingly, this Catalytic Plasma Torch has an extended lean limit that results in better fuel efficiency and lower emissions than spark ignition.

It is an object to provide an ignition system that is readily adjusted and/or controlled by conventional electrical or electronic means. In carrying out this invention there is a heater element and/or catalyst subject to current control means responsive to temperature, for example air intake temperature.

It is an object of this invention to provide an ignition system that has a low energy requirement while satisfying energy requirement prior to combustion via timed selective ionization of reactants in the pre-chamber. Conventional six or twelve volt current renders the heater element of this igniter fully operative, eliminating high tension coils and protected leads. This is a self timed ignition system, basically a single part per combustion chamber and with no moving parts. This system and igniter with its pre-chamber inherently retards timing with load as normally required, and it is adapted to current control so as to be responsive to mass of the combustible mixture that enters the pre-chamber for properly timed ignition.

From the foregoing it will understood that the heater element is responsive to the mass of the combustible mixture, as it changes during engine operation. Said heater element is itself a small sensitive part that operates at ignition temperatures, utilizing the principle of anemometry. The heater element is placed in a fixed location that will provide optimum light load operation of the engine, i.e. most advanced. In practice it is a hot wire exposed to the surrounding moving gas in such a way as to be cooled by said moving gas. Since the velocity of this gas is commensurate with piston velocity times a ratio, and since the heat removal ability of said moving gas is directly proportional to its mass, then the final temperature of said heater element is inversely proportional to the mass of the combustible charge. This causes ignition delay to increase with increased load, giving the timing curve a positive slope. And, as engine speed increases, so does the gas velocity; and at the same load the net mass passing the heater element remains constant so that the net temperature change remains the same. Therefore, for a given load the ignition delay remains constant in terms of crank angle throughout the speed range. Since the time for cumbustion decreases with increasing RPM, the timing is advanced with a proportional increase in current. Detonation is readily compenstated for by dropping the current through the heater element in response to a signal from a detonation sensor. Hense, this ignition method and igniter dynamically responds to engine load, as it is specially tailored to each cylinder and its combustion chamber. A feature is the simplicity of reliable controls to compensate for engine speed, and detonation, as may be necessary. Another feature is the inherent compensation for changes in atmospheric pressure. As atmospheric pressure decreases, this system and igniter inherently advances, so as to compensate for altitude and weather changes. Another feature is inherent compensation for engine wear, by lowering the charge density and advancing the ignition event as needed for each individual cylinder. And, temperature is compensated for by employing a resistance temperature detector (RTD) which lowers current through the heater element as the ambient temperature increases.

SUMMARY OF THE INVENTION

This inventive concept is characterized by timed compression responsive ignition with positive sloped timing controlled by an anemometer in the form of a precisely placed heater element. A feature is the flame throwing function and instantaneous ignition of the combustible mixture that compresses the gas spring within the pre-chamber. As a result, there are spikes of flame projected to cover the dome of the combustion chamber.

The foregoing and various other objects and features of this invention will be apparent and fully understood from the following detailed description of the typical preferred forms and applications thereof, throughout which description reference is made to the accomanying drawings.

THE DRAWINGS

Figure 5:
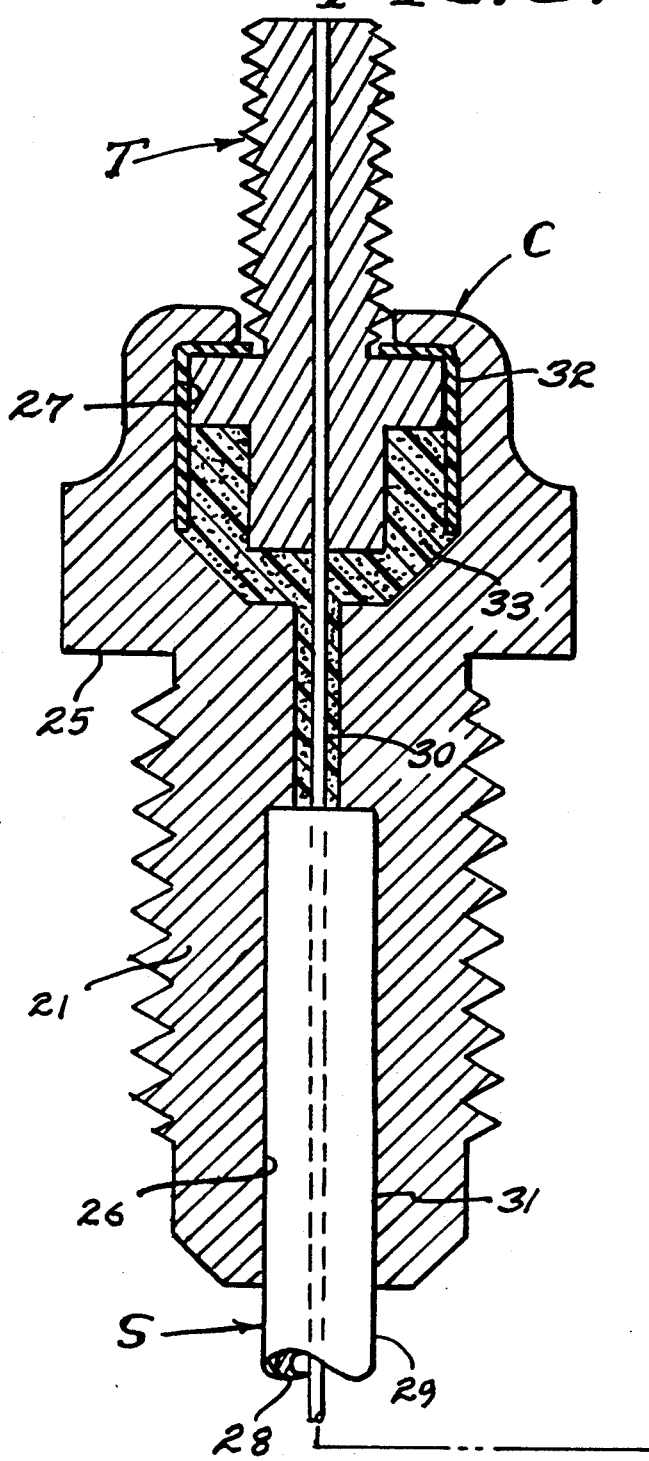
FIG. 5 is an englarged longitudinal sectional view showing the heater element structure.
Figure 6:
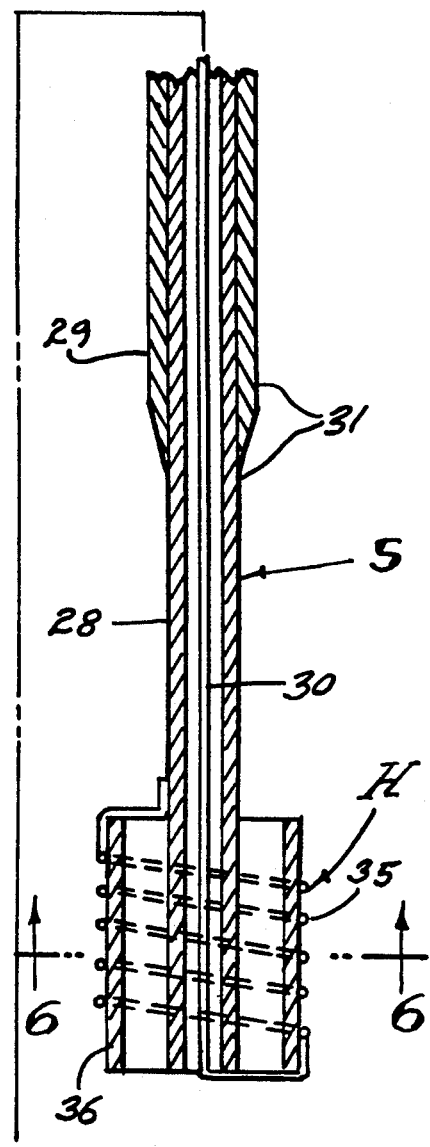
Figure 6:
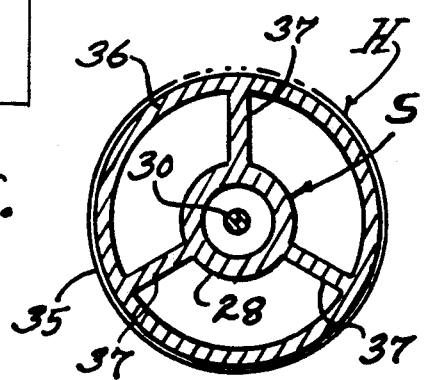

And, FIG. 6 is an enlarged bottom view of the support for the heater element per se taken as indicated by line 6—6 on FIG. 5.

PREFERRED EMBODIMENT

Figure 1:
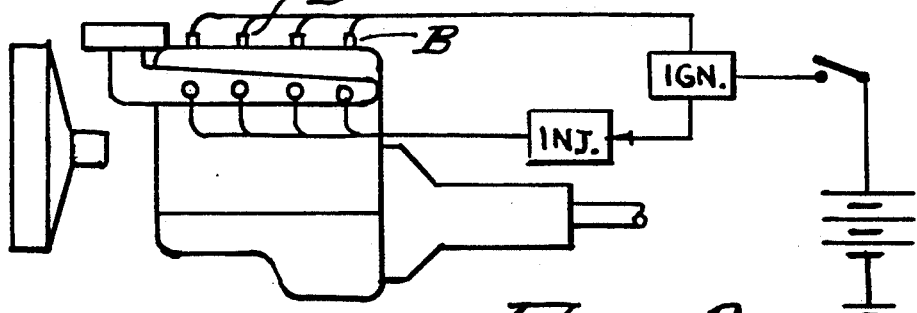
FIG. 1 is a diagramatic view of the present invention applied to a typical automotive engine, wherein a computer controls fuel injection.
Figure 2:
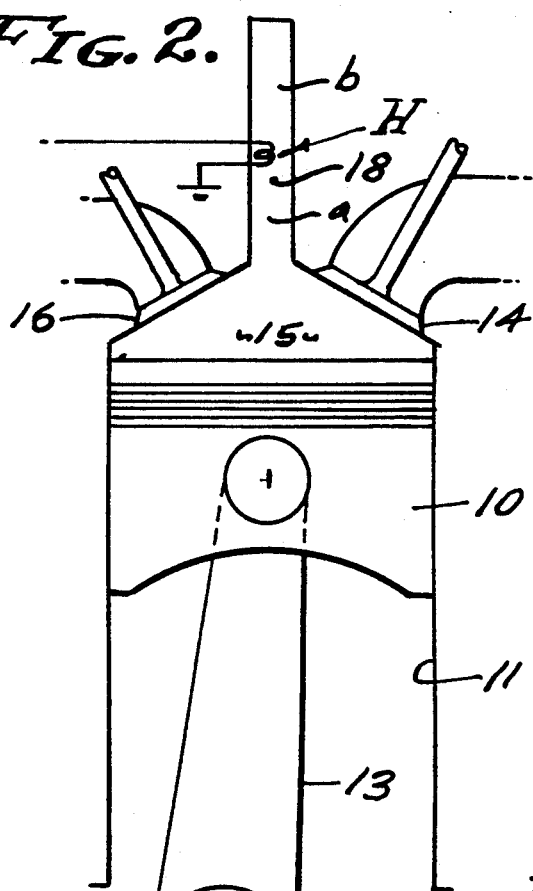
FIG. 2 is a diagramatic view of a typical internal comustion engine cross section, showing the pressure responsive ignition incorporated therein, with the crank shaft and piston shown in the compression cycle before top dead center position of the crank shaft and approximately at the normal position and condition where the ignition event takes place.

Referring now to compression timed ignition, and the illustration thereof in FIG. 2 of the drawings the principle of a gaseous spring is shown which responds in equilibrium to applied pressure that is relied upon. These gases consist of noncombustible gases either from the previous cycle or pure induced air. Cylinder chambers of uniform diameter and length are involved, there being an interface between the non-combustible gases and the combustible charge. There are pre-chambers of uniform diameter and length to match the characteristics of the engine cylinders, each opening into its cylinder. The size of the pre-chamber opening is relatively small in order to minimize the mixing effect of turbulence within the cylinder, although some mixing may occur and compensated for by increasing the pre-chamber length so as to increase the timing resolution or the distance that the gas charge interface travels relative to degree of engine rotation. Since interface travel is directly linked to time, a slower engine requires a longer chamber than a faster one.

The aforesaid gaseous interface moves in direct response to the applied pressure in order to maintain equilibrium with cylinder pressure. Pressure in the pre-chamber and engine cylinder is equal and change in pressure is proportional to the change in volume, the change in volume of the gas spring being proportional to the change in volume of the cylinder. Therefore, if the pre-chamber and stroke are of equal length, the interface location at any given time will be identical to the location of the piston in the cylinder bore. If the pre-chamber is shorter than the piston stroke, then the interface location is equal to the chamber/stroke ratio times the piston position. Since the piston position determines interface location of the combustible gas front, the contact angle of the charge with the catalytic heater element can be determined and said element positioned accordingly. This gaseous interface response is constant regardless of load or speed and thus the contact of the combustible charge with the catalyst remains constant.

Referring now to this method of compression timed ignition, it is the concept of Density Sensitivity that is controlling, and involves contact angle which is the moment when the combustible gaseous interface contacts the heater element in terms of crank angle (BTDC). As shown and described, the igniter is characterized by a "showerhead" design provided to evenly pierce the combustion chamber with individual spikes or torches of flame. Empirically, it has been determined, for conventional cylinder bores, that an eight hole 120° included depressed angle "showerhead" tip gives the ultimate performance and the better combustion characteristics. A feature is that this "showerhead" design concentrates on igniting the most difficult areas around the periphery of the combustion chamber, which is an improvement over flame propagation only from a center spark. These spikes or torches of flame are directed contiguous the combustion chamber dome.

The catalytic plasma torch as it is disclosed herein operates in a manner of a thermal dispersion mass flow senser. And, since the gas velocity in the pre-chamber is directly proportional to piston speed regardless of load, the only variables are the density and the composition of the cumbustible mixture of gases. By designing the pre-chamber in such a way that the flow of gases into the pre-chamber cools the catalyst, the timing of the ignition is retarded with load.

This method and timing element herein disclosed employs high resistivity and linear relationship between resistivity and temperature, using a platinum wire catalyst, excellent for temperature sensing, used herein as a hot-wire anemometer wherein resistance detects temperature as well as mass flow. By monitoring the reistance, temperature is determined, the coefficient of resistance for said wire being known. The platinum wire is heated by a constant current source, so that the voltage across the element will vary in direct proportion to the resistance, which varies in proportion to the temperature of the element. This monitors the chemical reaction on the catalyst surface and reflects the temperature of the surrounding gases.

The platinum catalyst used herein reaches a thermal balance where the electrical energy equals the heat energy out. This is determined by the heat capacity and mass transfer rate of the surrounding gas and the heat-sink effect of the supporting structure. When thermal balance is attained, the temperature of the gas surrounding the catalyst element will be substantially equal to that of the catalyst temperature. As long as this gas temperature is higher than the bulk gas temperature, changes in cylinder temperature will not effect catalyst temperature. This being the case, the only phenomenon that will change the catalyst temperature is a chemical reaction on its surface or an increase in said bulk gas temperature above the catalyst's temperature. Therefore, when a deviation from a steady state temperature occurs, it is because of one of said above two reasons. By using crank angle and cylinder pressure traces, it has been determined that this is due to a surface reaction, which becomes the indicator of contact angle when the combustible gas interface reaches the catalytic heater element location in the timing pre-chamber.

This method and compression timed ignition accounts for thermal mass response time, which is an important factor that determines the time that it takes between turning the current on and cranking the engine to start it. And when forced ignition is employed, it allows for determination of how far in advance and how much voltage must be applied to achieve the desired results. It will also determine how many cycles of engine operation will be needed to achieve a change in ignition timing for a given change is current. And, it will also aid in the proper design of the charge controlled compression timed igniter.

The platinum heater element has a thermal inertia based upon its specific heat and mass. Assuming a zero heat loss environment, a constant energy input would cause its temperature to rise in a linear fashion until melted. However, if placed in an infinite heat loss environment, the temperature of this hot wire would remain constant regardless of the energy input. Since thermal inertia of the hot wire is linked to physical constants such as mass and specific heat, this factor also will remain constant. Another factor comes into play which is the heat loss characteristics of the environment. This is governed by the specific heat of the substance surrounding the catalytic heater element and the mass transport rate due to thermal convection and radiant heat loss. The radiant heat loss being directly proportional to the temperature, the only heat loss factor is convective loss. Therefore, a time constant is produced.

In accordance with this method and structural application, and ultilizing the aforesaid principles, the ultimate objective of timing adjustment based upon mass is obtained for optimum engine operation. This concept is disclosed herein as mass controlled timing, as an improvement upon the basic timing chamber concepts of my previous patents. Ignition delay is inherent in the basic concept when density decreases producing a timing curve proportional to load but with a negative slope, However, as herein disclosed, timing delay is also proportional to load but with a positive slope. Accordingly, hot-wire anemometry is employed, wherein a catalytic heater element is placed in a fixed position that provides optimum light load operation, i.e. most advanced. This is a hot-wire heater element exposed to the combustible gas stream that passes over the heater element in such as a way as to be cooled by it. Since the velocity of the combustible mass interface duplicates piston velocity multiplied by a ratio, and since the heat removal ability of the passing gas is directly proportional to its mass, the final temperature of said element is inversely proportional to the mass of the combustible charge. This causes ignition delay to increase with increasing load, giving the timing curve a positive slope.

As engine speed increases, so does gas velocity. But at the same load, the net mass passing the heater element remains constant so that the net temperature change remains the same. Therefore, for a given load the ignition delay remains constant in terms of crank angle throughout the speed range. Since the time for combustion decreases with increasing RPM, the timing is advanced with a proportional increase in current. Detonation is compensated for by dropping current as the signal from a detonation sensor increases. Hence, this ignition method and apparatus, igniter, dynamically responds to load specifically tailored to combustion requirements. As will be described, simple and reliable controls implement the voltage and current changes through the catalytic heating element. Operational as well as engine wear are accounted for, and environment temperatures as well.

Referring now to the compression timed ignition method: A first step provides a closed pre-chamber with a timing zone and having at least one entry and exit port from and to the combustion chamber of the engine and with a buffer zone in open communication with the timing zone and extending away from the entry port; a second step exposes a heater element to the combustible fuel-air mixture at a position where the timing zone and buffer zone are in open communication within the pre-chamber; a third step transfers a pressure front comprised of a compressible fuel-air mixture from the combustion chamber of the engine and through the entry port to contact over the heater element (a catalyst) for the transfer of heat therebetween; a fourth step captures a determined volume of gases in the buffer zone as an elastic medium to react in equilibrium with the pressure of gases in the pre-chamber, as a spring; and a fifth step depresses the captured buffer zone gases with the penetrating pressure front of the combustible fuel-air mixture for contact over the heater element for ignition thereby and transfer of burning plasma into the combustion chamber for continued burning of the combustible fuel-air mixture therein to effect the power cycle and leaving burnt non combustible gases in the pre-chamber.

The first step of providing a pre-chamber exposes it to combustible fuel-air mixture within the combustion chamber, whereby a pressure front of combustible fuel-air mixture progressively penetrates through an entry and exit port and into (and from) the pre-chamber.

The second step of exposing the igniter means involves the placement of a low mass heater element at a determined depth of penetration into the pre-chamber timing zone. Preferably of platinum, a catalytic material, at a depth in the timing zone of the pre-chamber to attain the engine performance desired.

The third step of transferring a pressure front of combustible fuel-air mixture at compression temperature, into the pre-chamber is performed by providing open communication from the combustion chamber of the engine and into the timing zone of the pre-chamber, and by transferring heat between the mass of the heater element and the mass of the combustible fuel-air mixture.

The fourth step of capturing a determined volume of gases in the buffer zone of the pre-chamber involves a dead air space in which burnt gases are alternately compressed and depressed in equilibrium with gas pressure changes in the combustion chamber of the engine. Essentially therefore, the burnt gases captured in the buffer zone react as a spring of non combustible gases that occlude the heater element when subjected to reduced pressures and thereby extended, and that alternately expose the heater element to the pressure front of combustible fuel-air mixture when subjected to peak compression pressure of said combustible fuel-air mixture. Accordingly, the captured buffer zone gases react as an elastic spring controoling ignition timing in response to gas pressures as they prevail in the combustion chamber of the engine.

The fifth step of depressing the buffer zone gases is performed in response to the compression cycle of the engine and progresses until the pressure front of the combustible fuel-air mixture reaches and overlies the heater element for ignition thereby and transfer of burning plasma into the combustion chamber for continued burning of the combustible fuel-air mixture therein to effect the power cycle and leaving burnt non combustible gases in the pre-chamber.

Referring now to the mass controlled compression timed igniter as shown in FIGS. 2-6, FIG. 2 illustrates a typical reciprocating engine having a piston 10 operating in a cylinder 11 and coupled to a crank shaft 12 by a connecting rod 13. There is an intake valve 14 into a combustion chamber 15 at the top end of the cylinder, and there is an exhaust valve 16 therefrom. The characteristic requirement for such an engine is means for intake of a fuel-air mixture, means for effecting a compression cycle followed by a power cycle, and means for exhaust, and that there be a fuel-air mixture compression cycle followed by a power cycle.

Figure 4:
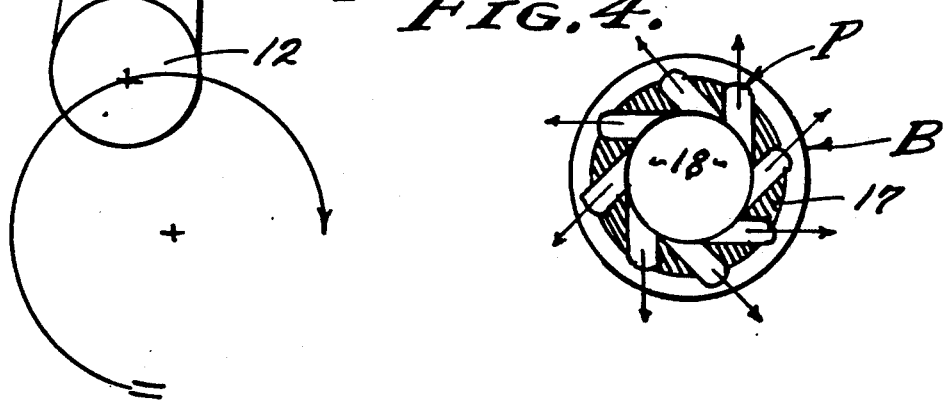
FIG. 4 is an enlarged bottom sectional view of the igniter taken as indicated by lne 4—4 on FIG. 3, showing the torch producing jet ports thereof.

As shown in FIG. 2, an entry and exit port P opens into the combuston chamber 15 to receive the pressure front of the fuel-air mixture during the compression cycle. Referring to FIG. 4, this invention provides at least one and preferably a plurality of entry-exit ports P in a "showerhead" formation through an end wall 17 of the igniter body B. The size of each port is relatively small, and the pre-chamber 18 in the body B is shown as 0.250 inch diameter; all of which will vary to meet with the requirements of different engines. A feature of this invention is that the total port passage diameter or flow capacity, substantially equals the diameter and/or timing zone pre-chamber passage, as shown.

The igniter involves generally, the body B and a carrier C for the heater element H and the electrical conductors thereto. And, in accordance with this compression timed mass controlled ignition system, there is what I term a timing zone a into which the front of combustible fuel-air mixture progresses in controlled opposition to the pneumatic spring pressure in what I term a buffer zone b. The pre-chamber 18 is comprised of these zones a and b in open communication with each other, open into the engine combustion chamber at one end and closed at the other end. In practice, the carrier C is a core-like member that extends along a central axis within the pre-chamber 18 and positions the heater element H intermediate said ends of the pre-chamber.

The body B is an elongated tubular member in the configuration of and adapted to replace a conventional spark plug, and thereby adapted to be retrofitted into a convention cylinder head. In practice, the body B is machined of solid metal hexagonal bar stock with a central axial bore entering a top end that is internally threaded at 20 and closed at a bottom end by a wall 17. The bore establishes the pre-chamber 18 that is closed by a plug 21 threadedly engaged into the top end at 20. The bottom wall 17 can vary in configuration and is preferably an inverted hemisphere in order to provide support for the "showerhead" principle of torch-flame distribution. The upper exterior 22 of the body is turned down from a large diameter at an intermediate nut portion 23, and the lower end 24 is of a reduced externally threaded diameter in the form of a reach portion that is threaded into the cylinder head of the engine to expose the hemispherical wall 17 into the combustion chamber of the engine.

Figure 3:
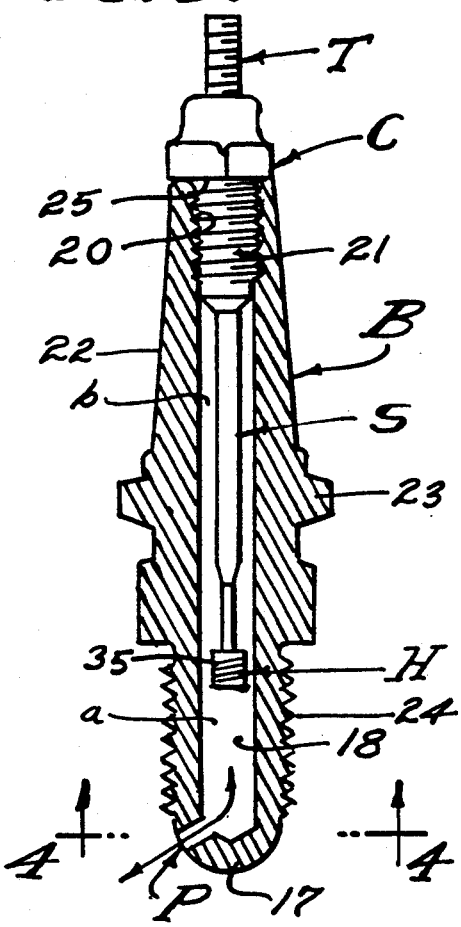
FIG. 3 is a longitudinal sectional view showing the igniter and its heater element.

The bottom pre-chamber wall 17 as shown in FIGS. 3 and 4 is an inverted shell of hemispherical configuration, and of uniform thickness. The "showerhead" arrangement of entry and exit ports P is circular in a horizontal plane, there being a multiplicity of ports equally spaced in a series around the dome-shaped hemisphere wall 17. As shown, there are eight ports P emanating from the major diameter of the interior surface of said shell and on axes extending outwardly and downwardly and with an outer side wall of each port tangent to said interior surface of the shell. Accordingly, the "showerhead" pattern is comprised of a multiplicity, eight, of ports P projected tangent to a circle described by the major diameter surface of the inner the hemispherical wall 17, and the axes of said ports are depressed angulary, 120° included, to project outwardly and downwardly. The total sectional area of the ports P is substantially equal to the sectional area of the pre-chamber 18, whereby full flow and entry of gases into intimate contact over the heater element H is ensured.

The carrier C is a closure for the remote end of the pre-chamber, remote from the ported wall 17. That is, the top end of body B is closed by the plug 21 threaded into the body B at 20. Additonally, the plug 21 carries both the heater element support S and the power terminal T therefor. As shown, the plug 21 is a turned part machined of hexagonal bar stock, with a shoulder 25 to seat and seal with the top of body B, with a lower socket 26 to receive the support S, and with an upper socket 27 to receive the power terminal T. The working temperatures at and near the heater element H are extreme, which requires a refractory type of insulator, preferably of small mass such as a small diameter ceramic tube 28, stiffened by a surrounding reinforcement tube 29. The inner tube passes a conductor 30 of high temperature wire, a heavy platinum wire, while the exterior of the tubes are plated with a high temperature material, a 0.001 inch plating of platinum at 31. Said plated tube assembly is pressed into the lower socket 26 for ground continuity. The terminal T is electrically insolated from the plug 21 by a sleeve 32 of dielectric material and potted in place in the socket 27 by means of cement 33 or the like. The conductor 30 is pressed into the plug body for electrical contiuity, as shown.

Referring now to the heater element H as it is shown in FIGS. 5 and 6 of the drawings, the hot-wire 35 is a small diameter platinum wire wound onto a thin-walled bobbin 36 of right cylinder form. A feature of the bobbin 36 is its very low mass, being of thin walled construction, whereby its response to mass changes in the contacting combustible mass are sensed as rapidly as possible, and therefore most effective. Therefore, the hot-wire 35 is permitted to respond at a corresponding rate to both changes in conbustible mass and changes in current applied. The swirl induced by the tangentially turned inlet ports P ensures intimate and thorough contact of the combustible mass over the hot-wire 35 surfaces for timely response. Basically, this ignition timing is inherent in the properties of the heating element mass per se, with variations applied by changes in current, and all of which is sensed for fuel injection control. As shown, the bobbin 36 is held spaced around the support tube 28 by radially disposed thin walled legs 37.

In accordance with this invention, thermal response to changes in the combustible fuel-air mass under compression entering the pre-chamber is responded to by the heater element H, operating as does an anamometer, and having the aforesaid functions, as follows:

1) operates as a catalyst to accelerate combustion.
2) operates as a timing means to retard and advance ignition in response to mass changes in the combustible mixture.
3) operates to respond to intake air temperature changes to produce a corresponding timing modification.
4) operates separately to sense changes in the compressed combustible charge to produce a signal to control fuel injection means correspondingly.

Having described only the typical preferred forms and applications of my invention, I do not wish to be limited or restricted to the specific details herein set forth but wish to reserve to myself any modifications or variations that may appear to those skilled in the art, as set forth within the limit of the following claims.

I claim:

1. A method of positive curve ignition timing in internal combustion engines having a compression cycle and ignition of a combustible fuel-air mixture in a combustion chamber followed by a power cycle, and including;

the first step of providing a closed pre-chamber in open communication with the combustion chamber for penetration therein of a pressure front of a mass of combustible fuel-air mixture, the second step of positioning an electrically powered hot wire anemometer-heater element having a determined mass and applying voltage and current thereto and at a depth of pressure front penetration of said combustible fuel-air mixture into the pre-chamber at a determined compression of said combustible fuel-air mixture, electrical resistance through the hot wire anemometer-heater element being sensed to increase electrical power to the hot wire anemometer-heater element for advanced ignition and to reduce power thereto for retarded ignition, thereby adjusting a positive curve timing slope, the third step of transferring the mass of combustible fuel-air mixture from the combustion chamber and into the pre-chamber for cooling contact with and over the said hot wire anemometer-heater element during the compression cycle and for the transfer of heat between the mass of the combustible fuel-air mixture and the mass of the hot wire anemometer-heater element.

the fourth step of capturing a volume of previously burnt non combustible gasses in the pre-chamber for occlusion of the hot wire anemometer-heater element and for depression as a spring, and the fifth step of depressing said captured previously burnt and combustible gases with the penetrating pressure front of combustible fuel-air mixture for said contact over the hot wire anemometer-heater element for ignition thereby and transfer of burning plasma into the combustion chamber for continued burning of the combustible fuel-air mixture therein to effect the power cycle and leaving burnt non combustible gases in the pre chamber.

2. Apparatus for positive curve timing chamber ignition in internal combustion engine having a combustion chamber, means for intake of a combustion fuel-air mixture of varying mass, means for effecting a compression cycle followed by a power cycle, and means for exhaust of burnt gases, and including;

an elongated pre-chamber means comprised of a timing zone with one end exposed into the combustion chamber and with at least one entry and exit port in open communication with the combustion chamber and a buffer zone continuing from the timing zone and with the other end closed to capture burnt gases therein, an electrically powered hot wire anemometer-heater element of minimal mass exposed within the pre-chamber between said entry and exit port and said other closed end for contact by a pressure front of said combustible fuel-air mixture of varying mass penetrating into the pre-chamber and contacting said hot wire anemometer-heater element during the compression cycle to affect the temperature of said hot wire anemometer-heater element according to the prevailing combustible fuel-air mixture mass and temperature, means sensing the electrical resistance through the hot wire anemometer-heater element to increase electrical power to the hot wire anemometer-heater element for advanced ignition and to reduce power thereto for retarded ignition, thereby providing a positive curve timing slope, the pre-chamber being closed by said other end to capture burnt gases therein so as to function as a spring opposed to the pressure front of said combustible fuel-air mixture, whereby burnt gases occlude the hot wire anemometer-heater element until exposed to the penetrating pressure front of combustible fuel-air mixture to ignite said fuel-air mixture for continued burning and projection through said at least one port and into the combustion chamber for ignition and continued burning of the combustible fuel-air mixture therein.

3. The method of positive curve ignition timing in internal combustion engines as set forth in claim 1, wherein an increase in the hot wire anemometer-heater element temperature advances ignition timing, and a decrease in said hot wire anemometer-heater element temperature retards ignition timing.

4. The method of positive curve ignition timing in internal combustion engines as set forth in claim 3, wherein the second step is performed by sensing resistance through the mass of the hot wire anemometer-heater element as a result of temperature change therein, producing a signal corresponding to the mass of the combustible mixture.

5. The method of positive curve ignition timing in internal combustion engines as set forth in claim 4, wherein the signal corresponding to the mass of the combustible mixture controls fuel-air mixture means.

6. The method of positive curve ignition timing in internal combustion engines as set forth in claim 5, wherein the signal corresponding to the mass of the combustible mixture controls fuel injection means.

7. The method of positive curve ignition timing in internal combustion engines as set forth in claim 1, wherein the third step is performed by increasing the combustible fuel-air mixture mass, causing a decrease in hot wire anemometer-heater element temperature to retard ignition timing, and by increasing the same to cause an increase therein to advance ignition timing.

8. The method of positive curve ignition timing in internal combustion engines as set forth in claim 7, wherein the hot wire anemometer-heater element is of minimal mass carried by a heat insulating support, whereby heat-sink effect therefrom is minimized.

9. The method of positive curve ignition timing in internal combustion engines as set forth in claim 1, wherein the second step is performed by current control means applying voltage through the hot wire anemometer-heater element for adjusting the ignition timing.

10. The method of positive curve ignition timing in internal combustion engines as set forth in claim 1, wherein the second step is performed by current control means responsive to air induction temperature and applying voltage through the hot wire anemometer-heater element for adjusting the ignition timing.

11. The igniter for positive curve ignition timing in internal combustion engines as set forth in claim 2, wherein a plug closes said other end of the pre-chamber and carries a support on the central axis of and carrying the hot wire anemometer-heater element.

12. The igniter for positive curve ignition timing in internal combustion engines as set forth in claim 11, wherein the hot wire anemometer-heater element is carried by a bobbin surrounding said support.

13. The igniter for positive curve ignition timing in internal combustion engines as set forth in claim 2, wherein a plug closes said other end of the pre-chamber and carries an electrical terminal in circuit with the hot wire anemometer-heater element to ground, and carries a support on a central axis within the pre-chamber with a bobbin on legs from and surrounding said support and on which is wrapped a resistance wire forming the hot wire anemometer-heater element.

14. The igniter for positive curve ignition timing in internal combustion engines as set forth in claim 2, wherein there is a multiplicity of entry and exit ports, the total cross sectional area of which substantially equals the cross sectional area of the pre-chamber.

15. The igniter for positive curve ignition timing in internal combustion engines as set forth in claim 2, wherein there is a multiplicity of entry and exit ports in series through the first mentioned end of the pre-chamber means and on axes projected between the pre-chamber and the combustion chamber of the engine.

16. The igniter for positive curve ignition timing in internal combustion engines as set forth in claim 2, wherein the first mentioned end of the pre-chamber is an inverted dome-shaped hemispherical wall exposed into the combustion chamber of the engine, the at least one entry and exit port opening through said wall.

17. The igniter for positive curve ignition timing in internal combustion engines as set forth in claim 2, wherein the first mentioned end of the pre-chamber is an inverted dome-shaped hemispherical wall exposed into the combustion chamber of the engine, there being a multiplicity of entry and exit ports through said wall and the total cross sectional area of which substantially equals the cross sectional area of the pre-chamber.

18. The igniter for positive curve ignition timing in internal combustion engines as set forth in claim 2, wherein the first mentioned end of the pre-chamber is an inverted dome-shaped hemispherical wall exposed into the combustion chamber of the engine, there being a multiplicity of entry and exit ports spaced in a series around said wall and each disposed with a side wall thereof tangent to a circle descried by an inner diameter of said hemispherical wall.

19. The igniter for positive curve ignition timing in intrnal combustion engines as set forth in claim 2, wherein the first mentioned end of the pre-chamber is an inverted dome-shaped hemispherical wall exposed into the combustion chamber of the engine, there being a multiplicity of entry and exit ports spaced in a series around said wall and each disposed angularly downward and outward and with a side wall thereof tangent to a circle described by an inner diamater of said hemispherical wall.

20. The igniter for positive curve ignition timing in internal combustion engines as set forth in claim 2, wherein the first mentioned end of the pre-chamber is an inverted dome-shaped hemispherical wall exposed into the combustion chamber of the engine, there being a multiplicity of entry and exit ports spaced in a series around said wall and each disposed angularly downward and outward at an included angle of substantially 120° and with a side all thereof tangent to a circle described by an inner diameter of said hemispherical wall.

21. The igniter for positive curve ignition timing in internal combustion engines as set forth in claim 2, wherein the means sensing the electrical resistance through the hot wire anemometer-heater element is responsive to current changes caused by temperature changes therein resulting from the cooling effect of the flow of fuel-air mixture mass penetrating thereover and into the pre-chamber, to retard ignition timing with the application of load.

22. The igniter for positive curve ignition timing in internal combustion engines as set forth in claim 2, wherein the means sensing the electrical resistance through the hot wire anemometer-heater element is responsive to the linear relationship between resistivity and temperature of the hot wire anemometer-heater element caused by temperature changes therein resulting form the cooling effect of the flow of fuel-air mixture mass penetrating thereover and into the pre-chamber and responding to resistance detected as temperature and fuel-air mixture mass flow and applied to retard ignition timing with the application of load.

* * * * *